(12) United States Patent
Nielsen et al.

(10) Patent No.: US 7,110,790 B2
(45) Date of Patent: Sep. 19, 2006

(54) QUICK ACCESS LIST FOR PREVIOUSLY ACCESSED NETWORK ADDRESSES

(75) Inventors: Peter Dam Nielsen, Brønshøj (DK); Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 443 days.

(21) Appl. No.: 09/968,970

(22) Filed: Oct. 3, 2001

(65) Prior Publication Data

US 2003/0064756 A1 Apr. 3, 2003

(51) Int. Cl.
*H04M 1/00* (2006.01)

(52) U.S. Cl. .............. 455/556.2; 455/414.1; 455/556.1; 711/117; 709/219; 379/88.17; 379/900; 340/7.29

(58) Field of Classification Search ............. 455/414.1, 455/426.1, 550.1, 557, 556.2, 62, 63.1, 63.2, 455/63.3, 63.4, 452.1, 452.2, 450, 552.1, 455/556.1, 566; 707/1, 10; 709/217–219, 709/224; 711/135–136, 139, 117; 345/738, 345/810, 855; 379/88.17, 900
See application file for complete search history.

(56) References Cited

U.S. PATENT DOCUMENTS

| | | | | |
|---|---|---|---|---|
| 5,727,129 A | * | 3/1998 | Barrett et al. ................ | 706/10 |
| 5,761,436 A | * | 6/1998 | Nielsen ...................... | 709/245 |
| 5,960,429 A | * | 9/1999 | Peercy et al. ................. | 707/5 |
| 6,037,934 A | * | 3/2000 | Himmel et al. .............. | 345/760 |
| 6,049,812 A | * | 4/2000 | Bertram et al. ............. | 715/516 |
| 6,356,898 B1 | * | 3/2002 | Cohen et al. ................. | 707/5 |
| 6,377,983 B1 | * | 4/2002 | Cohen et al. ............... | 709/217 |
| 6,453,342 B1 | * | 9/2002 | Himmel et al. ............. | 709/213 |
| 6,460,060 B1 | * | 10/2002 | Maddalozzo et al. ....... | 715/513 |
| 2001/0017855 A1 | * | 8/2001 | Ishigaki ...................... | 370/352 |
| 2001/0038394 A1 | * | 11/2001 | Tsuchimura et al. ........ | 345/811 |
| 2002/0077085 A1 | * | 6/2002 | Kalish et al. ............... | 455/414 |
| 2002/0184095 A1 | * | 12/2002 | Scullard et al. ............. | 705/14 |
| 2003/0140312 A1 | * | 7/2003 | Mohan et al. .............. | 715/513 |

* cited by examiner

*Primary Examiner*—William Trost
*Assistant Examiner*—James D. Ewart
(74) *Attorney, Agent, or Firm*—Alston & Bird LLP

(57) ABSTRACT

A method of providing access to network addresses for use in a mobile telecommunications device allowing navigation between different addresses and displaying of information therefrom, comprises compiling a first list of addresses bookmarked by a user and then compiling a second list of bookmarks selected on the basis of previous access by the user to said addresses via said first list. The second list may comprise the bookmarked addresses accessed most recently by the user, which will often be those most frequently used. However, the second list may instead comprise the addresses most frequently accessed by the user. The list may further contain entries corresponding to network addresses accessed by the user typing in the address. The provision of a second, selective list of addresses allows a user to access a favourite network address without scrolling through large numbers of bookmarks.

20 Claims, 5 Drawing Sheets

QUICK ACCESS LIST FOR PREVIOUSLY ACCESSED NETWORK ADDRESSES

FIELD OF THE INVENTION

This invention relates to a mobile telecommunications device with an improved browser for navigating between pages at different network addresses and home pages.

BACKGROUND

Conventional mobile telecommunications devices such as telephone handsets have been designed primarily for speech calls and have only a limited capability for handling data. Recommendations have been developed to provide a wireless application protocol (WAP) to promote common standards and specifications for data services that operate over wireless communication networks. WAP enabled telephone handsets have been developed which allow the user to access remote servers. Data content is provided in a mark up language, similar to conventional hyper text mark up language (HTML) known as a wireless mark up language (WML), which is configured to allow a page of HTML data to be displayed as a deck of individual cards which are of the size suited for display on the relatively small display screen usually available on a mobile device such as a cellular telephone handset or personal digital assistant (PDA).

The data is supplied by WML servers at individual network addresses, with a homepage that act as an entry point to a particular site together with further pages or decks with individual addresses that can be navigated by the user. To this end, the mobile device is provided with a browser to display the data.

A WML server can be accessed by dialling an individual telephone number associated with a WAP gateway which acts as a proxy server between the WML server itself and the mobile device, which acts as the client.

Newer, faster data services for mobile communication devices have been developed, including I-Mode, GPRS and UMTS which operate in a generally similar way, with the mobile device acting as client to remote servers, and a browser to display the accessed data on the mobile device. The browser that is used for mobile telecommunications devices is conventionally known as a microbrowser, which is controlled by keys on the mobile device. Instead of using a mouse-driven cursor, a focus region is provided, which can be navigated around the display by keys that may include a scrolling key on the mobile device. The keys may be so-called soft keys that can be pre-programmed to perform different functions depending on the display provided by the browser. Conventionally, one of the soft keys allows the user to move backwards through previously visited network addresses. Also, a bookmark list may be stored so that individual network addresses can be readily accessed.

However, where a bookmark list contains a large number of entries, the procedure of scrolling through the list to locate a particular network address may be laborious and time-consuming. As the use of such services is likely to rise in the future and the allowed number of entries stored in a typical browser bookmark list increases, perhaps to over 100 entries, locating the desired address may become difficult, even with the use of folders or a searching function.

SUMMARY OF THE INVENTION

According to the invention, a mobile telecommunications device is provided, which includes a browser to permit a user to navigate between different pages and display information therefrom. The device further comprises a processor to compile a first list of bookmarks, and to compile a second list of bookmarks selected on the basis of previous access by the user to said addresses via the first bookmark list. The first list may comprise entries selected by the user or may comprise bookmarks pre-loaded into the device, for example by a network operator or which may be pushed or pulled to the device from a server. The second list may comprise the bookmarked addresses accessed most recently by the user. The most recently accessed bookmarks will often be those most frequently used, however, the second list may instead comprise the addresses most frequently accessed.

The second list may further comprise entries corresponding to addresses previously accessed by the user manually typing the address into the handset.

It is preferable that the second list is shorter, and therefore less cumbersome than the main bookmark list. The second list may comprise a selected number of entries, for example 10–20 entries. Alternatively, the list may comprise all the entries in the bookmark list or manually entered, in order of frequency of access by the user.

The device according to the invention may comprise a mobile telephone handset or a PDA.

The invention further provides a method of providing access to network addresses, allowing navigation between different addresses and displaying of information therefrom, comprising compiling a first list of addresses bookmarked by a user and compiling a second list of bookmarks selected on the basis of previous access by the user to said addresses via said first list.

Thus, in accordance with the invention, the user of a mobile device can readily navigate to the most useful network addresses without needing to scroll through large numbers of entries in the main bookmark list.

BRIEF DESCRIPTION OF THE DRAWINGS

In order that the invention may be more fully understood an embodiment thereof will now be described by way of example with reference to the accompanying drawings in which.

DETAILED DESCRIPTION

Figure 1:
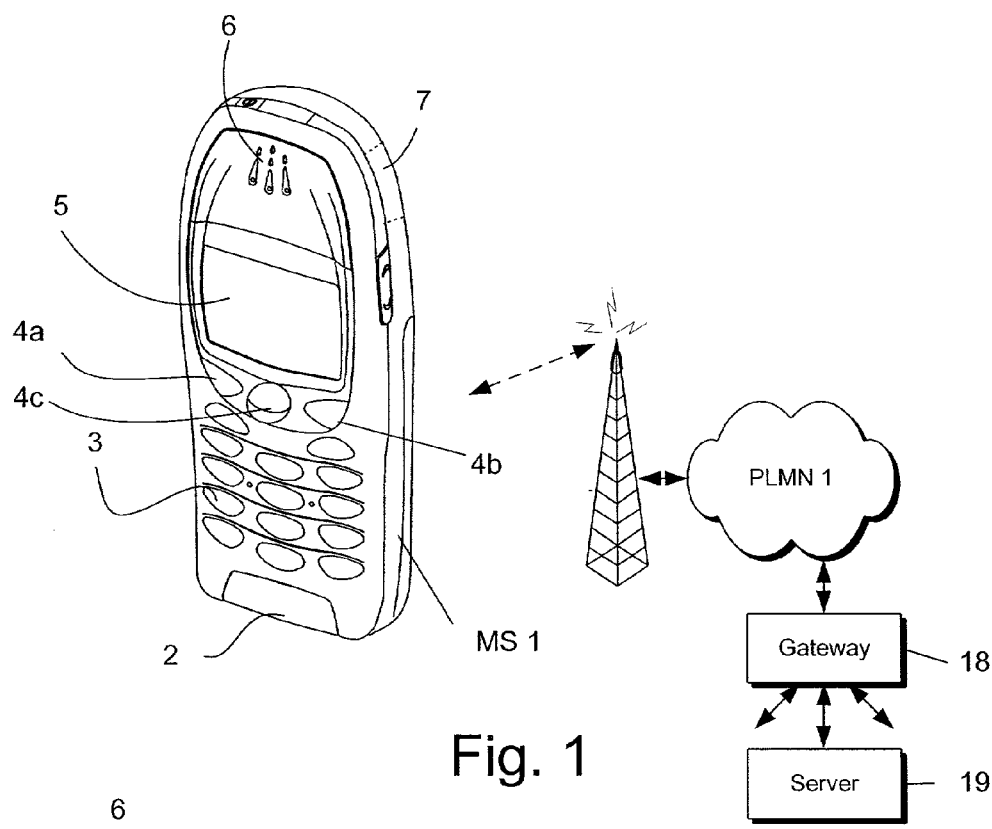
FIG. 1 is a schematic block diagram illustrating a mobile telephone handset, which can communicate through a public land mobile network (PLMN) and through a gateway to remote data servers.

In FIG. 1, a mobile station in the form of a battery driven telephone cellular handset MS 1, is shown schematically in radio communication with PLMN 1. The mobile handset MS1 includes a microphone 2, keypad 3, soft keys 4, a liquid crystal display device 5, earpiece 6 and internal antenna 7.

Figure 2:
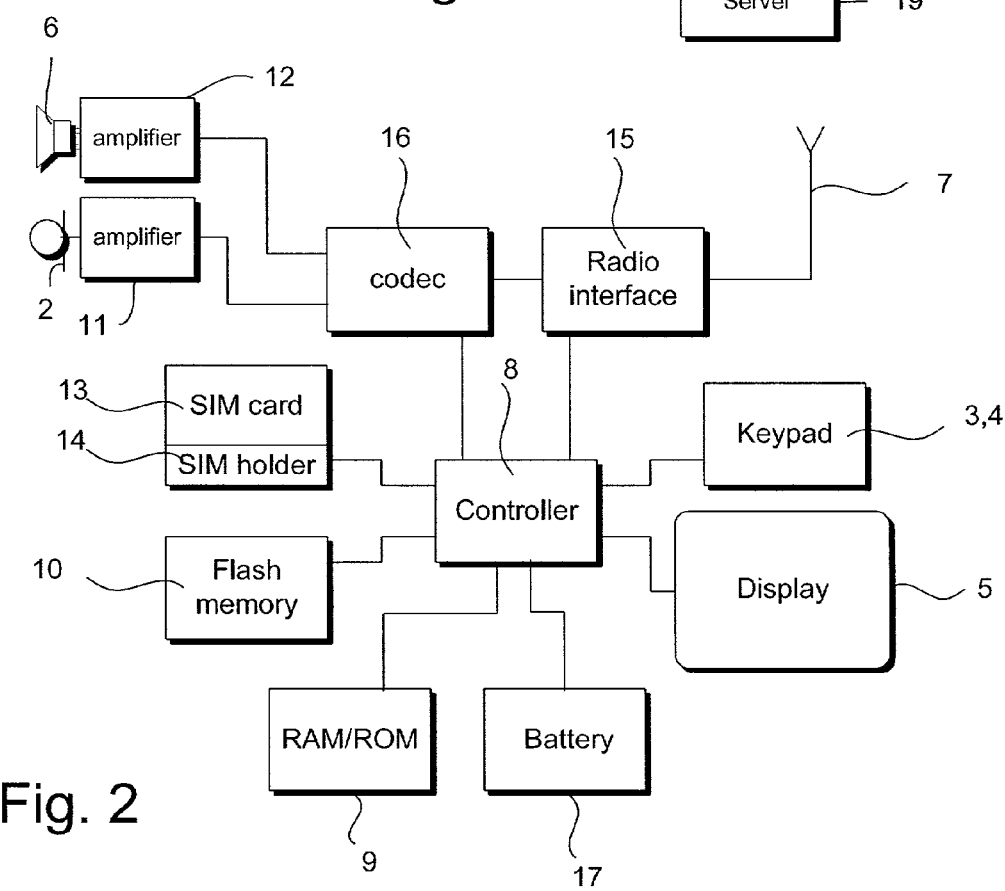
FIG. 2 is a schematic block diagram of the circuitry of the mobile handset shown in FIG. 1.

The circuitry of the handset MS 1 is shown in more detail in FIG. 2. Signal processing is carried out under the control of a digital micro-controller 8 that has an associated RAM/

ROM 9 and flash memory 10. Electrical analog audio signals are produced by microphone 2 and amplified by pre-amplifier 11. Similarly, analog audio signals are fed to the earpiece 6 through an amplifier 12. The micro-controller receives instruction signals from the keypad and so-called soft keys 4a, b, c, and controls operation of the LCD display 5.

Information concerning the identity of the user is held on a smart card 13 in the form of a GSM SIM card, which contains the usual GSM international mobile subscriber identity and encryption K, that is used for encoding the radio transmission in a manner well known per se. The SIM card 13 is removably received in a SIM cardholder 14. Radio signals are transmitted and received by means of the antenna 7 connected through an r.f. stage 15 to a codec 16 configured to process signals under the control of a micro-controller 8.

Thus, in use, for speech, the codec 16 receives analog signals from the microphone amplifier 11, digitizes them into a form suitable for transmission and feeds them to the rf stage 15 for transmission through antenna element 7 to PLMN 1 shown in FIG. 1. Similarly, signals received from PLMN 1 are fed through the antenna element to be demodulated by the rf stage 15 and fed to codec 16 so as to produce analog signals fed to amplifier 12 and earpiece 6.

The mobile station MS1 is also configured to operate as a client to receive data from remote servers and to communicate through PLMN 1 to a gateway 18 shown in FIG. 1 that acts as a proxy server for connection to remote servers, such as server 19. For example, for a WAP enabled system, access to the gateway 18 is provided by dialling a telephone number associated with the gateway although other communication techniques can be used e.g. for GPRS and UMTS. The server 19 may provide data corresponding to individual sites each with an individual homepage with a specific network address or universal resource locator (URL). The data may be provided in WML through the PLMN 1 to the handset MS1, which acts as a mobile client.

The mobile handset MS1 runs a microbrowser. The software for running the microbrowser may be held in flash memory 10 shown in FIG. 2, so as to be run by the micro-controller 8 and provide an output on display 5.

Figure 3:
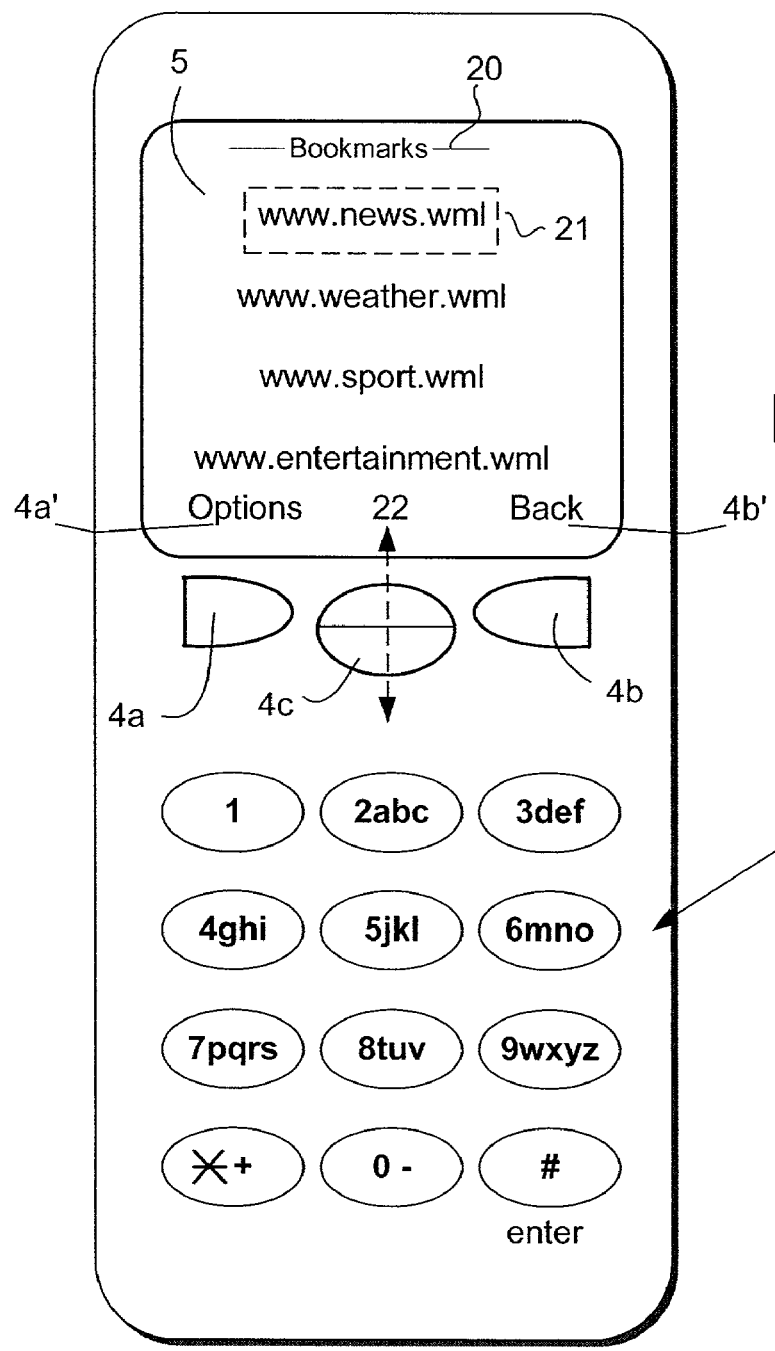
FIG. 3 illustrates schematically the display of the bookmark list on the handset.

An example of the display provided by the microbrowser is shown in more detail in FIG. 3. In this example of the display 5, the user has elected to view the bookmark list, listing network addresses previously selected by the user, as illustrated by information bar 20. The bookmarks include entries in the form of menu options, which comprise links to corresponding network addresses. The links may be selected using a so-called focus region 21 which can be scrolled upwardly and downwardly shown in FIG. 3 using key 4c, which can be pushed upwardly and downwardly in the direction of arrow 22 in order to perform a scrolling function. Thus, as shown in FIG. 3, the network address "www.news.wml" falls within the focus region 21. The bookmarks may have been produced by the user in a conventional manner or may have been pre-loaded into the handset, for example by a network operator or which may be pushed or pulled to the device from a server.

Soft keys 4a and 4b are attributed functions shown on the display 5, which varies from display to display. For the bookmark list shown in FIG. 3, the keys 4a, 4b are attributed functions "options" and "back" respectively and appropriate legends 4a' and 4b' are displayed on the LCD display 5 under the control of software being run by controller 8. If the key 4a is actuated, a list of options e.g. select, re-load, help etc are displayed (not shown) on the display 5. The "select" function may then chosen from the displayed list using the scrolling key 4c, in the event that the user wants to actuate the link to the "www.news.wml" address shown in FIG. 3. At this time, the soft key function attributed to the key 4a is itself "select" so that an operation of the key 4a will cause the link to the news page within the focus region 21 to be actuated and navigation to the "www.news.wml" network address is carried out.

Figure 4:
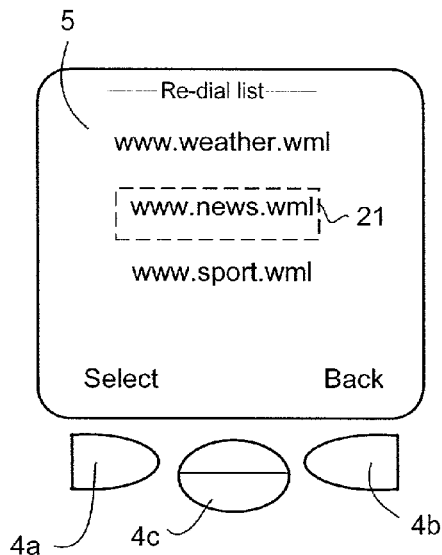
FIG. 4 illustrates the display of a second list of selected bookmarks and addresses.

Alternatively, the user may elect to view a second list of bookmarks, e.g. the "re-dial" list shown in FIG. 4, which lists the bookmarks that are deemed most likely to be re-dialled by the user. The user has recently navigated to network addresses "www.news.wml", "www.sport.wml" and "www.weather.wml". This second list stores only addresses that were previously bookmarked, or manually entered by the user and, therefore, the individual network addresses associated with pages decks or cards within these sites that were navigated previously are not stored in the second list. The re-dial list of FIG. 4 can only contain a small number of bookmarks compared with the bookmark list of FIG. 3. For example, the bookmark list may have a maximum capacity of 200 bookmarks whereas the re-dial list may have a maximum capacity of 10 bookmarks.

The soft key 4a is attributed a "select" function so that the user can scroll using key 4c to select one of network addresses and navigate directly to the relevant page by appropriately moving the focus region 21 and operating the select key 4a.

Figure 5:
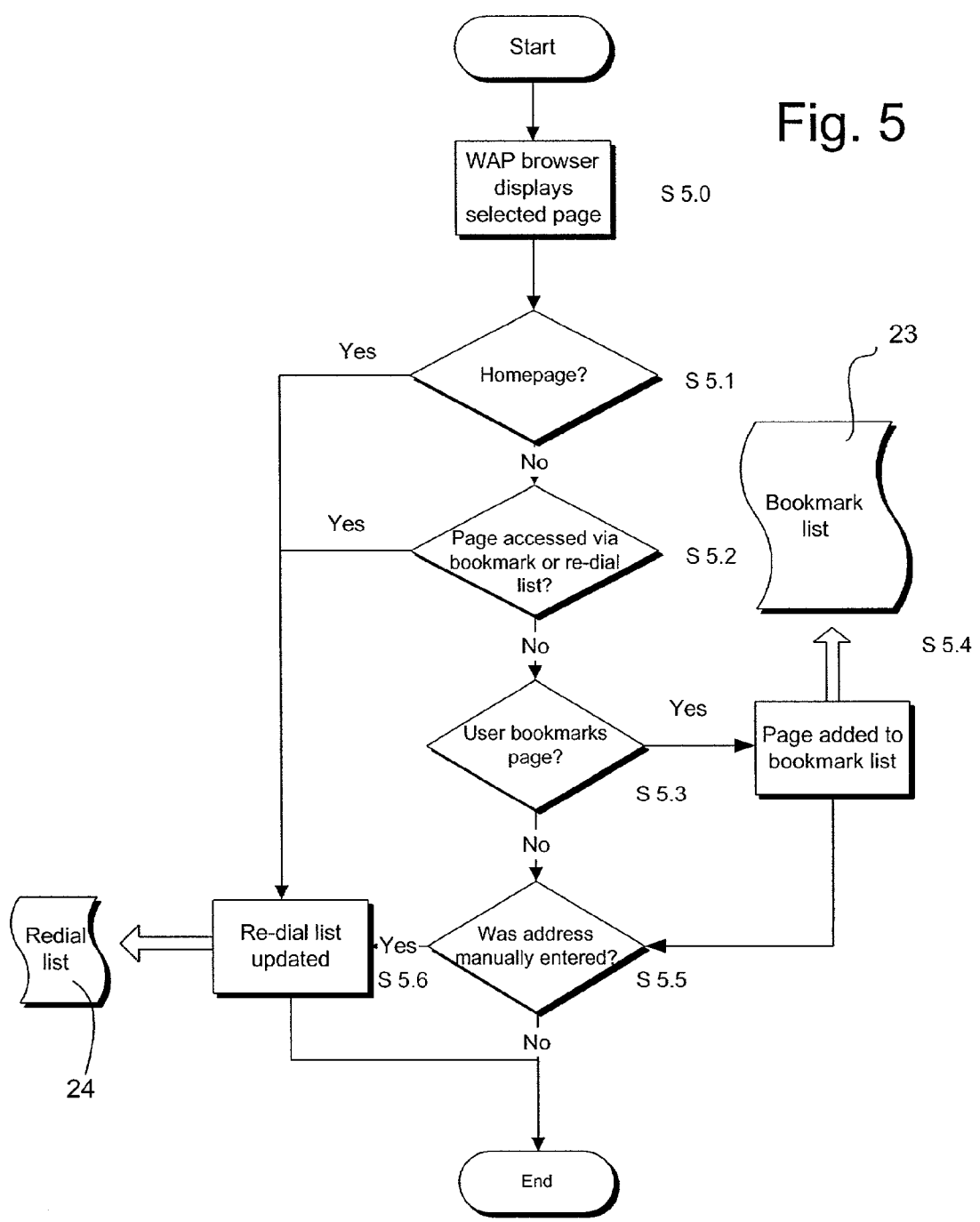
FIG. 5 is a schematic flowchart of a process for compiling the bookmark and selected bookmark lists.

FIG. 5 illustrates bookmark list 23 and re-dial list 24 together with a process for updating bookmarks held in both lists. The user may navigate to a desired page, by one of the following methods: selecting a bookmark from either of the lists shown in FIGS. 3 and 4, manually typing in a network address or URL, or by following a link provided in another page viewed in the browser, as shown at step S 5.0.

At step S 5.1, a check is made to determine if the displayed page is a homepage, and if so, the redial list 24 is updated as will be explained hereinafter (S 5.6), so as to contain the home page address as a bookmark.

If the displayed page is not a homepage, then at S 5.2, it is determined whether the page displayed at S 5.0 was accessed using the bookmark list 23 or the redial list 24. In this instance, the re-dial list 24 is updated (S 5.6), to include the relevant network address.

If the page was accessed by other means, the user may choose to bookmark it (S 5.3), in which case an entry is made in the main bookmark list 23 (S 5.4). If the user had typed in the address, determined in step S 5.5, a separate entry is made in the re-dial list 24 (S 5.6), regardless of whether the user has bookmarked the page.

The re-dial list 24 therefore contains entries relating to homepages, pages accessed using the bookmark list 23, the re-dial list 24, or by entering an address manually. Network addresses accessed by following links are not included, so that the re-dial list 24 is limited the pages that are likely to be currently important to the user.

Figure 6:
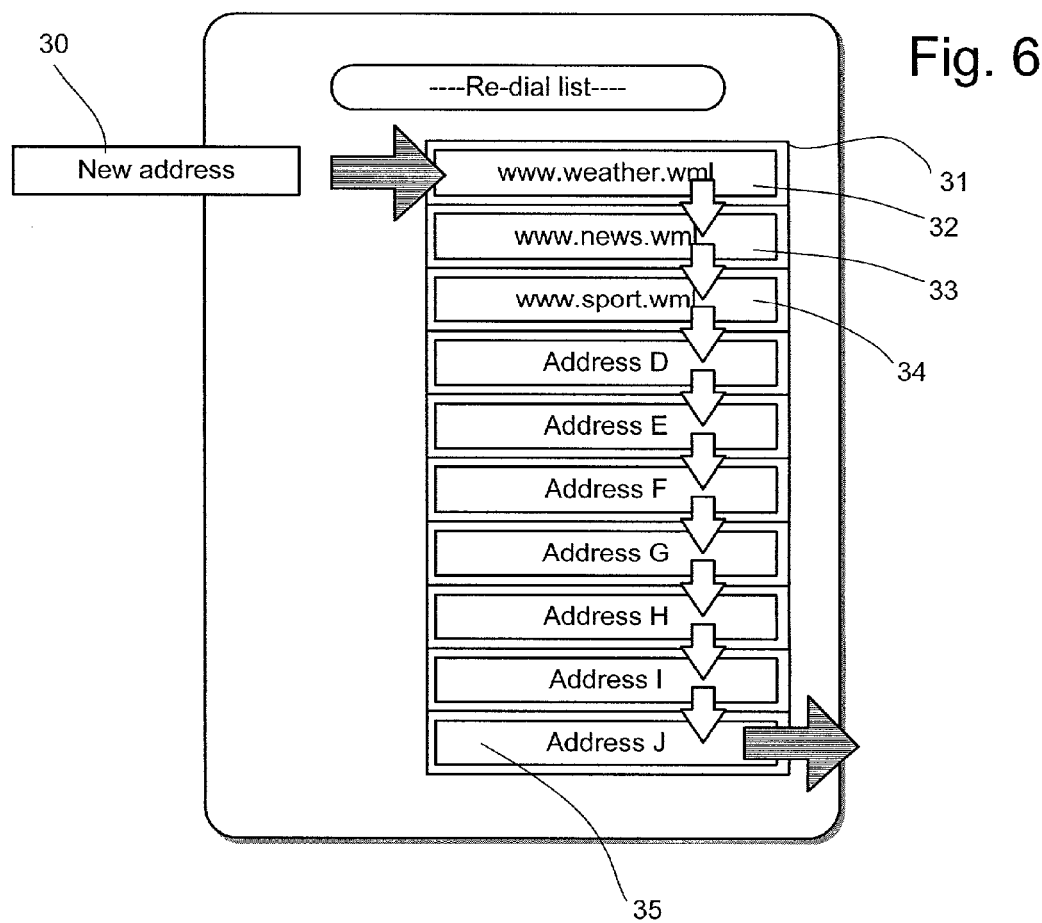
FIGS. 6 and 7 illustrate schematically the process of updating the list of selected bookmarks.
Figure 7:
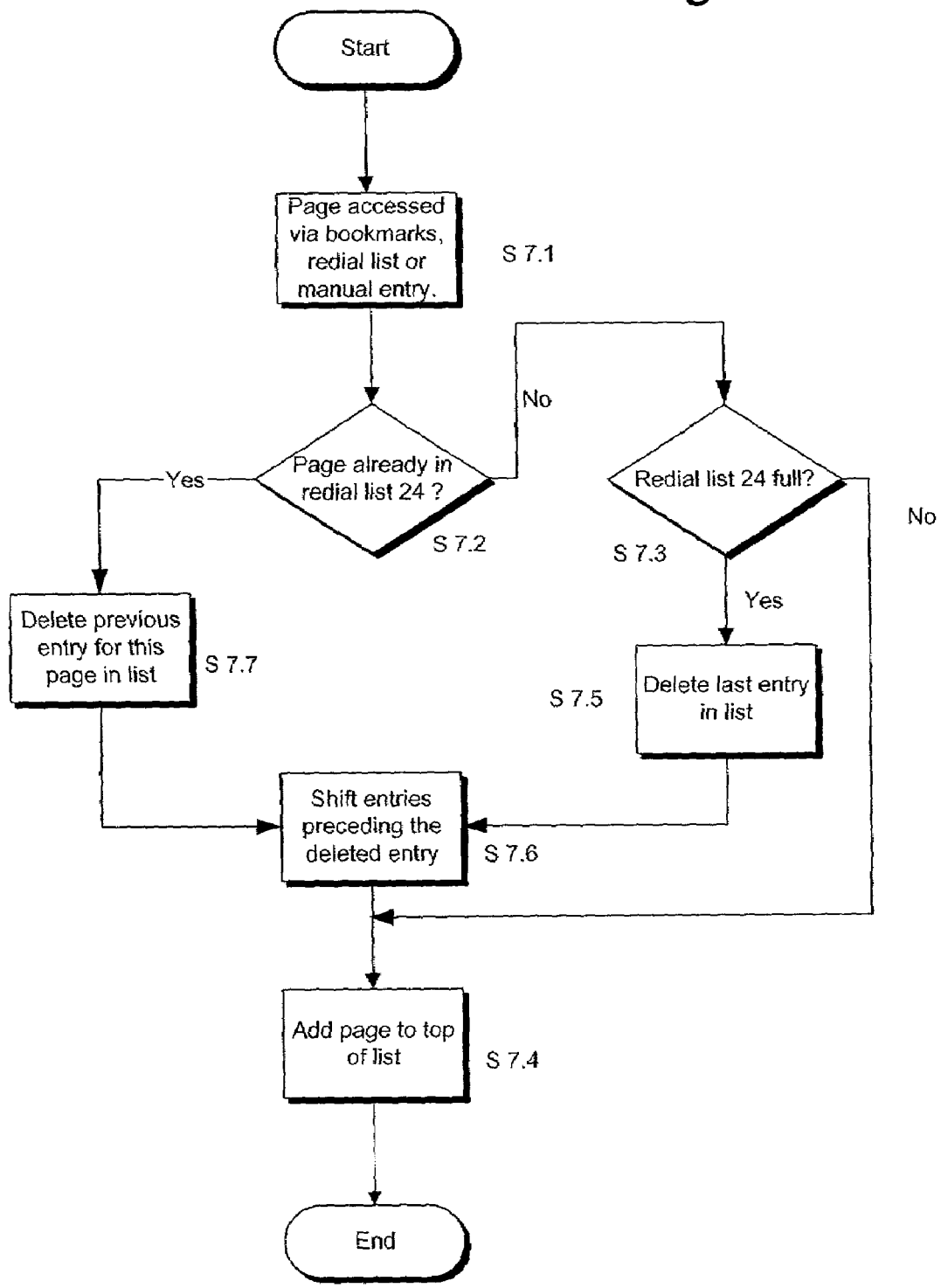

The process of updating the bookmark list is explained with reference to FIGS. 6 and 7. FIG. 6 depicts memory organization of the RAM/ROM 9 shown in FIG. 2. Memory locations corresponding to a selected number of network addresses for the visited pages are cached in a shift register according to how recently they were last accessed. When a page I accessed by a user via the bookmark list 23, re-dial list 24, or manual address entry (S 7.1), the controller 8 determines whether the relevant network address is already stored in the re-dial list (S 7.2). If this is not the case, a check is made at step S 7.3 to determine if the re-dial list is full of bookmark entries. If it is not full, the new address may be added to the top of the list shown at step S 7.4. If the list 24 is full, the final entry 35 is deleted from the memory location corresponding to the bottom of the list (S 7.5) and the entries above it, 32–34 and addresses D-I, are shifted (S 7.6) so that the new address 30 may be added to the top of the list 31 (S 7.4).

However, the page already has an entry in the re-dial list, e.g. if the address to be added 30 related to "www.sport.wml", the previous entry 34 relating to that page is removed (S 7.7), any preceding entries 32, 33 are shifted accordingly (S 7.6) and the address stored at the memory location corresponding to the top of the list 31 (S 7.4). In this manner, the most frequently used network addresses will tend to remain on the re-dial list, producing a short list of the pages visited most regularly by the user.

The re-dial list comprises the network addresses that are likely to be most frequently accessed by a user and, as it may be much shorter than the main bookmark list, allows the user of a mobile telecommunications device to quickly select and access a favorite network address without the inconvenience of scrolling through large numbers of bookmarks.

Many modifications and variations falling within the scope of the invention will be evident to those skilled in the art. For example, whilst the described example relates to the use WAP technology, the invention can be used in any mobile telecommunications system in which mobile devices act as clients for remote servers. Also, whilst the invention has been described in relation to the example of a telephone handset, it can be used in other mobile devices such as PDAs, gaming devices and remote handheld devices for home entertainment systems.

What is claimed is:

1. A mobile telecommunications device comprising:
a browser to permit a user to navigate between different network addresses and display information therefrom; and
a processor to compile a first list of bookmarked addresses and to compile a second list of bookmarks selected from the group consisting of: (i) bookmarks selected on the basis of previous access by the user to said bookmarked addresses via said first list, (ii) bookmarks of network addresses manually entered by the user, and (iii) bookmarks selected on the basis of access by the user by following a link to a homepage.

2. A mobile telecommunications device as in claim 1, where the second list comprises entries corresponding to the bookmarked addresses, manually entered network addresses, and homepage addresses linked to by the user that have been most recently accessed by the user and which are organized in order of recency of access.

3. A mobile telecommunications device as in claim 1, where the second list comprises entries corresponding to the bookmarked addresses, manually entered network addresses, and homepage addresses linked to by the user that have been most frequently accessed by the user and which are organized in order of frequency of access.

4. A mobile telecommunications device as in claim 1, wherein the processor is adapted to permit the user to selectively limit the compiling of the second list to less than all of (i) bookmarks selected on the basis of previous access by the user to said bookmarked addresses via said first list, (ii) bookmarks of network addresses manually entered by the user, and (iii) bookmarks selected on the basis of access by the user by following a link to a homepage.

5. A mobile telecommunications device as in claim 1, wherein the processor is adapted to permit the user to confirm if a network address manually entered by the user is selected for compiling in the second list.

6. A mobile telecommunications device as in claim 1, wherein the processor is adapted to permit the user to confirm if a homepage linked to by the user is selected for compiling in the second list.

7. A mobile telecommunications device comprising:
a browser to permit a user to navigate between different network addresses and display information therefrom; and
a processor to compile a first list of bookmarked addresses and to compile a second list of bookmark entries selected on the basis of previous access by the user to said bookmarked addresses via said first list,
wherein the processor is adapted to compile the second list of bookmark entries without creating a complete record of all network addresses visited by the user.

8. A mobile telecommunications device comprising:
a browser to permit a user to navigate between different network addresses and display information therefrom; and
a processor to compile a first list of bookmarked addresses and to compile a second list of bookmark entries selected on the basis of previous access by the user to said bookmarked addresses via said first list,
wherein the processor is adapted to compile the second list of bookmark entries without creating a usage trail of navigation by the user.

9. A mobile telecommunications device comprising:
a browser to permit a user to navigate between different network addresses and display information therefrom; and
a processor to compile a first list of bookmarked addresses and to compile a second list of bookmark entries selected on the basis of previous access by the user to said bookmarked addresses via said first list,
wherein the second list of bookmark entries consists of bookmarked addresses selected from the group consisting of (i) bookmarked addresses accessed by the user from the first list, (ii) bookmarked addresses previously accessed by manual entry of an address by the user, and (iii) bookmarked addresses accessed by the user by following a link to a homepage.

10. A mobile telecommunications device as in claim 9, wherein the second list of bookmark entries consists of bookmarked addresses selected from the group consisting of (i) bookmarked addresses accessed by the user from the first list and (ii) bookmarked addresses previously accessed by manual entry of an address by the user.

11. A mobile telecommunications device as in claim 9, wherein the second list of bookmark entries consists of bookmarked addresses selected from the group consisting of (i) bookmarked addresses accessed by the user from the first list and (ii) bookmarked addresses accessed by the user by following a link to a homepage.

12. A mobile telecommunications device as in claim 9, wherein the second list of bookmark entries consists of bookmarked addresses accessed by the user from the first list.

13. A method of providing access to network addresses, allowing navigation between different addresses and displaying of information therefrom, comprising:
compiling a first list of bookmarked addresses which are bookmarked by a user; and
compiling a second list of bookmarks selected from the group consisting of (i) bookmarks selected on the basis of previous access by the user to said bookmarked addresses via the first list, (ii) bookmarks of network addresses manually entered by the user, and (iii) bookmarks selected on the basis of access by the user by following a link to a homepage.

14. A method according to claim 13, wherein compiling the second list comprises adding entries corresponding to the bookmarked addresses, manually entered network addresses, and homepage addresses linked to by the user that have been most recently accessed by the user and which are organized in order of recency of access.

15. A method according to claim 13, wherein compiling the second list comprises adding entries corresponding to the bookmarked addresses, manually entered network addresses, and homepage addresses linked to by the user that have been most frequently accessed by the user and which are organized in order of frequency of access.

16. A method according to claim 13, wherein compiling the second list comprises permitting the user to selectively limit the compiling of the second list to less than all of (i) bookmarks selected on the basis of previous access by the user to said bookmarked addresses via said first list, (ii) bookmarks of network addresses manually entered by the user, and (iii) bookmarks selected on the basis of access by the user by following a link to a homepage.

17. A method according to claim 13, wherein compiling the second list comprises permitting the user to confirm if a network address manually entered by the user is selected for compiling in the second list.

18. A method according to claim 13, wherein compiling the second list comprises permitting the user to confirm if a homepage linked to by the user is selected for compiling in the second list.

19. A computer program product operable to control a browser for a mobile telecommunications device, wherein the computer program product comprises at least one computer-readable storage medium having computer-readable program code portions stored therein, and wherein the computer-readable program code portions comprise:

a first code for causing the browser to compile a first list of bookmarked addresses which are bookmarked by a user; and a second code for causing the browser to compile a second list of bookmarks selected from the group consisting of (i) bookmarks selected on the basis of previous access by the user to said bookmarked addresses via the first list, (ii) bookmarks of network addresses manually entered by the user, and (iii) bookmarks selected on the basis of access by the user by following a link to a homepage.

20. A method of providing access to network addresses, allowing navigation between different addresses and displaying of information therefrom, comprising:

compiling a first list of bookmarked addresses which are bookmarked by a user; and compiling a second list of bookmark entries selected on the basis of previous access by the user to the bookmarked addresses via the first list, wherein compiling the second list of bookmark entries is performed without creating a complete record of all network addresses visited by the user wherein the inclusion of network addresses visited and not included in the second list is not based on how recently the network address was visited by the user.

* * * * *